Figure 1:
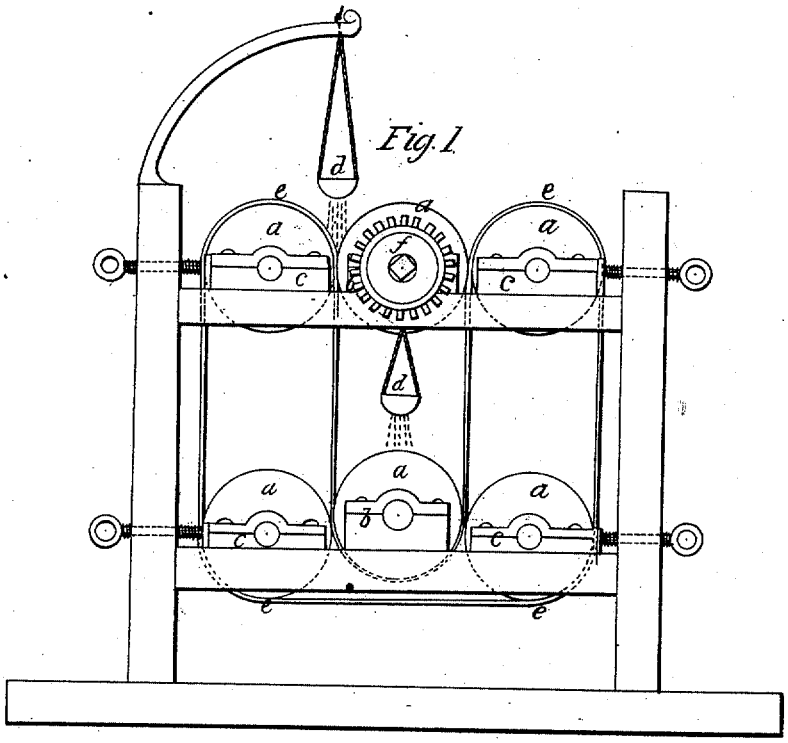
Figure 3:
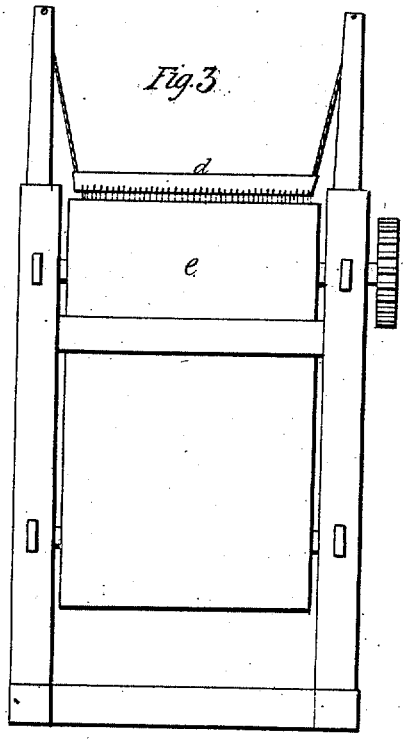
Figure 2:
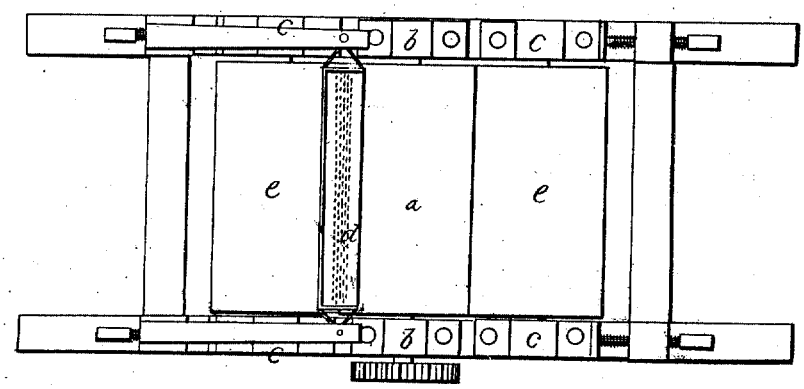

7219X

No Printed Specification Available

J. Ames.
Sizing Paper.
Patented Sept. 1, 1832.

X7219 Sept. 1. 1832 Sept 1, 1832 545

John Ames, of Springfield Massachusetts

Letters Patent

The Schedule referred to in these Letters Patent and making part of the same containing a description in the words of the said John Ames himself of his improvement in the mode of sizing paper by machinery To all persons to whom these presents shall come, John Ames of Springfield in the County of Hampden and Commonwealth of Massachusetts, Gentleman Sends Greeting Be it known that I the said John Ames have invented constructed made and applied to use, a new and useful invention and improvement in the method and process of sizing Paper by machinery as herein set forth and specified viz. Upon a frame of proper strength and materials I place near and parallel to each other three cylinders, of wood or metal of about 18 or 20 inches in diameter and in length conforming to the width of the paper to be sized to revolve in a horizontal position upon their respective axes.

The boxes or bearings upon which the axes of one of said cylinders rests are fixed — those of the other two are moveable and governed by screws so as to regulate the distances of the cylinders from each other. Above the line between the middle cylinder and one of the outer ones and parallel to them I suspend a pipe or trough pierced with small holes, in such a position that the sizing matter with which said trough or pipe is to be filled may drop between said two cylinders. Below said cylinders three parallel rollers corresponding in length with said cylinders are arranged so that the middle roller shall be elevated a little above the line of the other two. Above the middle roller I suspend another pipe or trough as above described to be also filled with sizing matter. An endless web of felt is made to pass over one of the outer cylinders & between it & the middle one, thence down under the middle roller thence up between the middle cylinder and the other outer one, thence over the latter and down under the two lowest rollers and [illegible] up to the place of beginning. The cylinders are to be brought in close contact by means of the screws applied to the said moveable boxes or bearings. The paper to be sized, is brought over the outer cylinder and introduced between it and the middle one, immediately under the sizing trough or pipe, from which the sizing matter drops, and sufficiently wets one side, it then passes under the middle cylinder to which it adheres, the felt passes down under the middle roller and is wet by the sizing matter oozing from the lower sizing trough or pipe, and again ascending it passes between the other outer cylinder and the middle one pressing the paper against the latter, and thus sufficiently sizing the other side of the paper. The sized paper is to be then disengaged from the middle cylinder (to which it adheres as aforesaid) and taken off by a cylindrical or other suitable reel.

The moving power is applied to the middle cylinder which communicates motion by friction to the other parts of the machine connected by the endless felt. The same result may be produced by a different position and arrangement of parts.

I do not claim the cylinders, endless felt, web or other parts of the machine separately as my invention, all that I claim specifically as mine is the several parts of said machine in combination with the use of endless felt web for the purpose of sizing paper In testimony that the foregoing is a true specification of my said improvement as above described I have hereto set my hand the twenty second day of August Anno Domini One thousand Eight hundred and thirty two.

Exd. Witnesses
Wm. Bless
Willm. Moore

John Ames (715 words)

(Patented first September 1832)